(12) United States Patent
Takeuchi

(10) Patent No.: US 12,351,721 B2
(45) Date of Patent: Jul. 8, 2025

(54) INK JET RECORDING METHOD

(71) Applicant: SEIKO EPSON CORPORATION, Tokyo (JP)

(72) Inventor: Emi Takeuchi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 200 days.

(21) Appl. No.: 18/072,972

(22) Filed: Dec. 1, 2022

(65) Prior Publication Data

US 2023/0174803 A1 Jun. 8, 2023

(30) Foreign Application Priority Data

Dec. 2, 2021 (JP) ................. 2021-195911

(51) Int. Cl.
*C09D 11/32* (2014.01)
*B41M 7/00* (2006.01)
*C09D 11/38* (2014.01)

(52) U.S. Cl.
CPC ........... *C09D 11/32* (2013.01); *B41M 7/0081* (2013.01); *C09D 11/38* (2013.01)

(58) Field of Classification Search
CPC .... B41M 7/0081; C09D 11/101; C09D 11/32; C09D 11/322; C09D 11/38
See application file for complete search history.

(56) References Cited

U.S. PATENT DOCUMENTS

| 2014/0362152 A1 | 12/2014 | Fukumoto et al. |
| 2019/0092957 A1* | 3/2019 | Nakano ................. C09D 11/54 |
| 2020/0231725 A1* | 7/2020 | Matsushita .......... C08F 220/301 |

FOREIGN PATENT DOCUMENTS

| EP | 2042335 | * | 4/2009 | .............. B41M 5/50 |
| EP | 2042335 A2 | * | 4/2009 | .......... B41M 5/0011 |
| EP | 2423278 A1 | | 2/2012 | |
| JP | 2012-051992 A | | 3/2012 | |
| JP | 2018-138654 A | | 9/2018 | |

* cited by examiner

*Primary Examiner* — Anh T Vo
(74) *Attorney, Agent, or Firm* — Harness, Dickey & Pierce, P.L.C.

(57) ABSTRACT

An ink jet recording method includes a step of ejecting a radiation curable ink jet composition on a recording medium and a step of emitting radiation rays to the recording medium, the ink jet composition contains a colorant and a thioxanthone-based photopolymerization initiator, the colorant includes neither a yellow-based colorant nor a black-based colorant, and emission energy of the radiation rays is set to 900 mJ/cm$^2$ or more per one emission.

5 Claims, No Drawings

INK JET RECORDING METHOD

The present application is based on, and claims priority from JP Application Serial Number 2021-195911, filed Dec. 2, 2021, the disclosure of which is hereby incorporated by reference herein in its entirety.

BACKGROUND

1. Technical Field

The present disclosure relates to an ink jet recording method.

2. Related Art

Heretofore, an ink jet recording method which performs recording by ejecting an ink or the like from an ink jet head has been known. For example, JP-A-2018-138654 has disclosed, as an ink to be used for the recording method described above, a radiation curable ink jet composition containing a thioxanthone-based photopolymerization initiator and a yellow colorant or a black colorant.

However, in the ink jet composition disclosed in JP-A-2018-138654, when a colorant other than the yellow or the black colorant is changed, for example, to a colorant such as a cyan or a magenta colorant, a problem in that yellowing with time of a cured film is liable to be conspicuous may occur in some cases. In more detail, although the thioxanthone-based photopolymerization initiator is excellent in curing property, the yellowing of the cured film may become conspicuous depending on the type of colorant to be used. In particular, when the ink jet composition is cured by radiation rays having low emission energy, for example, in order to reduce the size of a recording apparatus, the yellowing gradually advances some time after the emission, and the appearance of a recorded image immediately after the recording may be different from that in an actual use environment. That is, an ink jet recording method which suppresses yellowing with time of a cured film has been desired.

SUMMARY

According to an aspect of the present disclosure, there is provided an ink jet recording method comprising: ejecting a radiation curable ink jet composition on a recording medium and emitting radiation rays to the recording medium, the ink jet composition contains a colorant and a thioxanthone-based photopolymerization initiator, the colorant includes neither a yellow-based colorant nor a black-based colorant, and emission energy of the radiation rays is set to 900 mJ/cm$^2$ or more per one emission.

DESCRIPTION OF EXEMPLARY EMBODIMENTS

Hereinafter, although an embodiment of the present disclosure (hereinafter, referred to as "this embodiment") will be described in detail, the present disclosure is not limited thereto and may be variously changed and/or modified without departing from the scope thereof.

1. Radiation Curable Ink Jet Composition

Before an ink jet recording method of this embodiment is described, a radiation curable ink jet composition to be used for the ink jet recording method will be described.

The radiation curable ink jet composition is an ink jet composition to be cured when being irradiated with radiation rays. In addition, in this specification, the radiation curable ink jet composition is simply called the "ink composition" in some cases. As the radiation rays, for example, there may be mentioned ultraviolet rays, electron rays, infrared rays, visible light rays, or X-rays. Among those mentioned above, since a radiation source is easily available and widely used, and since a material suitably cured by emission of ultraviolet rays is easily available and widely used, as the radiation rays, ultraviolet rays are preferable.

The ink composition contains a colorant, a polymerizable compound, and a thioxanthone-based photopolymerization initiator.

1.1. Colorant

The ink composition contains, as the colorant, neither a yellow-based colorant nor a black-based colorant and contains other colorants. As the other colorants, for example, there may be mentioned colorants having a cyan, a magenta, a green, a brown, an orange color, and the like. As the other colorants described above, at least one of a pigment and a dye may be used.

Since the pigment is used as the colorant, a light resistance of the ink composition can be improved. As the pigment, an organic pigment or an inorganic pigment may be used.

As the organic pigment, for example, there may be mentioned a phthalocyanine pigment, a perylene pigment, a perinone pigment, a quinacridone pigment, a dioxane pigment, a thioindigo pigment, or a dye chelate (such as a basic dye type chelate or an acidic dye type chelate).

As a pigment used for the magenta-based colorant, for example, there may be mentioned C.I. (Colour Index Generic Name) Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245; or C.I. Pigment Violet 19, 23, 32, 33, 36, 38, 43, or 50.

As a pigment used for the cyan-based colorant, for example, there may be mentioned C.I. Pigment Blue 1, 2, 3, 15, 15:1, 15:2, 15:3, 15:34, 15:4, 16, 18, 22, 25, 60, 65, or 66; or C.I. Vat Blue 4 or 60.

As a pigment other than the magenta and the cyan, for example, there may be mentioned C.I. Pigment Green 7 or 10; C.I. Pigment Brown 3, 5, 25, or 26; or C.I. Pigment Orange 1, 2, 5, 7, 13, 14, 15, 16, 24, 34, 36, 38, 40, 43, or 63.

As the colorant, a white pigment may also be used. Although the white pigment used for the ink composition is not particularly limited, as examples thereof, there may be mentioned a titanium oxide, a zinc oxide, a zinc sulfide, an antimony oxide, a magnesium oxide, and a zirconium oxide. In addition, besides the white inorganic pigments mentioned above, a white organic pigment, such as white hollow resin fine particles or high molecular weight particles, may also be used.

The pigment may be used in the form of a pigment dispersion liquid and may use a dispersant, if needed. The dispersant is not particularly limited, and for example, a dispersant, such as a high molecular weight dispersant, which is generally used for preparation of a pigment dispersion liquid may be mentioned. As a concrete example thereof, there may be mentioned a dispersant containing, as a primary component, at least one selected from a polyoxyalkylene polyalkylene polyamine, a vinyl-based polymer, a copolymer thereof, an acrylic-based polymer, a copolymer thereof, a polyester, a polyamide, a polyimide, a polyurethane, an amino-based polymer, a silicon-containing polymer, a sulfur-containing polymer, a fluorine-containing polymer, and an epoxy resin. The dispersant may be used alone, or at least two types thereof may be used in combination.

As a commercially available product of the high molecular weight dispersant, for example, there may be mentioned AJISPER (registered trademark) series manufactured by Ajinomoto Fine-Techno Co., Inc.; Solsperse series (registered trademark) 36000 or the like manufactured by Lubrizol; DISPER BYK series manufactured by BYK Additives & Instruments; or DISPARLON (registered trademark) series manufactured by Kusumoto Chemicals, Ltd.

A content of the dispersant with respect to a total mass of the ink is preferably 0.1 to 2.0 percent by mass, more preferably 0.1 to 1.0 percent by mass, and further preferably 0.1 to 0.5 percent by mass.

When the dye is used as the colorant, the dye is not particularly limited, and for example, an acidic dye, a direct dye, a reactive dye, and/or a basic dye may be used. As the dye, for example, there may be mentioned C.I. Acid Red 52, 80, 82, 249, 254, or 289; C.I. Acid Blue 9, 45, or 249; C.I. Direct Red 1, 4, 9, 80, 81, 225, or 227; C.I. Direct Blue 1, 2, 15, 71, 86, 87, 98, 165, 199, or 202; or C.I. Reactive Red 14, 32, 55, 79, or 249.

The dyes mentioned above may be used alone, or at least two types thereof may be used in combination.

A content of the colorant in the ink composition with respect to the total mass of the ink composition is preferably 0.2 to 20.0 percent by mass, more preferably 0.5 to 15.0 percent by mass, and further preferably 1.0 to 10.0 percent by mass.

1.2. Polymerizable Compound

The polymerizable compound is a component to be cured by a polymerization reaction which is promoted by radiation rays to be emitted.

1.2.1. Polymerizable Compound Having Aromatic Ring

The ink composition preferably contains a polymerizable compound having an aromatic ring.

Accordingly, when a thioxanthone-based photopolymerization initiator is used together with an acylphosphine oxide-based photopolymerization initiator, a curing property of the ink composition can be improved. As the polymerizable compound having an aromatic ring, a monofunctional polymerizable compound having an aromatic ring is used.

Although the monofunctional polymerizable compound having an aromatic ring is not particularly limited, for example, there may be mentioned phenoxyethyl (meth) acrylate, benzyl (meth)acrylate, an alkoxylated 2-phenoxyehtyl (meth)acrylate, ethoxylated nonylphenyl (meth) acrylate, an alkoxylated nonylphenyl (meth)acrylate, a p-cumylphenol EO-modified (meth)acrylate, or 2-hydroxy-3-phenoxypropyl (meth)acrylate.

Among those mentioned above, phenoxyethyl acrylate (PEA) is preferable. Accordingly, a solubility of the thioxanthone-based photopolymerization initiator and the curing property of the ink composition are further improved.

A content of the monofunctional polymerizable compound having an aromatic ring with respect to the total mass of the ink composition is preferably 34 percent by mass or less, more preferably 33 percent by mass or less, and further preferably 31 percent by mass or less. When the content of the polymerizable compound having an aromatic ring is set to 34 percent by mass or less, the degree of yellowing at an initial stage can be suppressed.

1.2.2. Other Polymerizable Compounds

The ink composition may contain other polymerizable compounds besides the polymerizable compound having an aromatic ring. As the other polymerizable compounds, a monofunctional monomer and/or a polyfunctional monomer may be used.

Although the monofunctional monomer is not particularly limited, for example, a monofunctional monomer having an alicyclic group and/or a monofunctional monomer having a nitrogen-containing hetero ring may be mentioned.

Although the monofunctional polymerizable compound having an alicyclic group is not particularly limited, for example, there may be mentioned an alicyclic group-containing (meth)acrylate, such as dicyclopentenyl (meth)acrylate, dicyclopentenyloxyethyl (meth)acrylate, dicyclopentanyl (meth)acrylate, 3,3,5-trimethylcyclohexyl (meth) acrylate, isobornyl (meth)acrylate, tert-butylcyclohexanol (meth)acrylate, or 2-(meth)acrylic acid-1,4-dioxaspiro[4,5] dec-2-ylmethyl.

Among those mentioned above, dicyclopentenyl (meth) acrylate or isobornyl acrylate (IBXA) is preferable.

A content of the monofunctional monomer with respect to a total mass of the polymerizable compound contained in the ink composition is preferably 10 to 90 percent by mass, more preferably 20 to 85 percent by mass, and further preferably 25 to 80 percent by mass.

When the content of the monofunctional monomer is in the range described above, a flexible cured film can be obtained, and adhesion of the cured film to a recording medium is increased. Accordingly, when a recorded matter is contracted by heating, cracking is not likely to be generated in the cured film. In addition, when the recorded matter is contracted by heating, and a recording surface of the recorded matter is closely adhered to a material to be packed, the cured film is suppressed from being blocked to the material to be packed.

Although the polyfunctional monomer is not particularly limited, for example, a vinyl group-containing (meth)acrylate and/or a polyfunctional (meth)acrylate may be mentioned.

Although the vinyl group-containing (meth)acrylate is not particularly limited, for example, a compound represented by formula (1) may be mentioned.

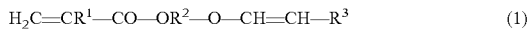

$$H_2C=CR^1—CO—OR^2—O—CH=CH—R^3 \quad (1)$$

In the formula, $R^1$ represents a hydrogen atom or a methyl group, $R^2$ represents a divalent organic residue having 2 to 20 carbon atoms, $R^3$ represents a hydrogen atom or a monovalent organic residue having 1 to 11 carbon atoms.

In the above formula (1), as the divalent organic residue having 2 to 20 carbon atoms represented by $R^2$, there may be mentioned a linear, branched, or cyclic substituted or unsubstituted alkylene group having 2 to 20 carbon atoms, a substituted or unsubstituted alkylene group which has 2 to 20 carbon atoms and an oxygen atom derived from an ether bond and/or an ester bond in the structure, or a substituted or unsubstituted divalent aromatic ring having 6 to 11 carbon atoms.

Among those mentioned above, an alkylene group, such as an ethylene group, an n-propyl group, an isopropyl group, or butylene group, having 2 to 6 carbon atoms or an alkylene group, such as an oxyethylene group, an oxy-n-propylene group, an oxyisopropylene group, or an oxybutylene group, having 2 to 9 carbon atoms and an oxygen atom derived from an ether bond in the structure is preferable. Furthermore, in order to further decrease a viscosity of the ink and to further improve the curing property of the ink, a compound having a glycol ether chain in which $R^2$ is an alkylene group, such as an oxyethylene group, an oxy-n-propylene group, an oxyisopropylene group, or an oxybutylene group, having 2 to 9 carbon atoms and an oxygen atom derived from an ether bond in the structure is more preferable.

In the above formula (1), as the monovalent organic residue having 1 to 11 carbon atoms represented by $R_3$, a linear, branched, or cyclic substituted or unsubstituted alkyl group having 1 to 10 carbon atoms or a substituted or unsubstituted aromatic ring having 6 to 11 carbon atoms is preferable.

Among those mentioned above, an alkyl group, such as a methyl group or an ethyl group, having 1 to 2 carbon atoms or an aromatic ring, such as a phenyl group or a benzyl group, having 6 to 8 carbon atoms is preferably used.

In addition, the compound represented by the formula (1) is not to be included in the polymerizable compound having an aromatic ring.

Although a concrete example of the compound represented by the formula (1) is not particularly limited, for example, 2-(2-vinyloxyethoxy)ethyl (meth)acrylate may be mentioned, and 2-(2-vinyloxyethoxy)ethyl acrylate (VEEA) is preferable.

In particular, the ink composition preferably contains, as the polyfunctional monomer, a vinyl group-containing (meth)acrylate represented by the above formula (1). Accordingly, the curing property of the ink composition is further improved.

A content of the vinyl group-containing (meth)acrylate with respect to the total mass of the polymerizable compound contained in the ink composition is preferably 1 to 25 percent by mass and more preferably 2 to 20 percent by mass. Since the content of the vinyl group-containing (meth) acrylate is in the range described above, the viscosity of the ink composition is suppressed from being increased, and an ink composition excellent in ejection stability is provided.

Although the polyfunctional (meth)acrylate is not particularly limited, for example, there may be mentioned a bifunctional (meth)acrylate, such as dipropylene glycol di(meth) acrylate, diethylene glycol di(meth)acrylate, or triethylene glycol di(meth)acrylate; or an at least trifunctional (meth) acrylate, such as trimethylolpropane tri(meth)acrylate, an EO-modified trimethylolpropane tri(meth)acrylate, pentaerythritol tri(meth)acrylate, pentaerythritol tetra(meth) acrylate, or dipentaerythritol hexa(meth)acrylate.

A content of the polyfunctional (meth)acrylate with respect to the total mass of the polymerizable compound contained in the ink composition is preferably 30 to 75 percent by mass, more preferably 40 to 65 percent by mass, and further preferably 50 to 55 percent by mass. Since the content of the polyfunctional (meth)acrylate is in the range described above, the curing property of the ink composition and an abrasion resistance of the cured film are further improved.

1.3. Thioxanthone-Based Photopolymerization Initiator

The ink composition of this embodiment contains a thioxanthone-based photopolymerization initiator. Since the thioxanthone-based photopolymerization initiator is contained, the curing property of the ink composition is improved. In particular, in a region in which a coating film of the ink composition adhered to a recording medium is thin, radicals which are active species generated from a photopolymerization initiator are liable to receive oxygen inhibition. Accordingly, the curing property is degraded, and as a result, tackiness may be generated on the surface of the cured film. Even in the case as described above, according to the ink composition of this embodiment, the curing property is secured, and the tackiness of the cured film can be reduced.

Although the thioxanthone-based photopolymerization initiator is not specifically limited, in particular, at least one selected from the group consisting of thioxanthone, a diethylthioxanthone, an isopropylthioxanthone, and a chlorothioxanthone is preferably contained. In addition, although not specifically limited, as the diethylthioxanthone, 2,4-diethylthioxanthone is preferable, as the isopropylthioxanthone, 2-isopropylthioxanthone is preferable, and as the chlorothioxanthone, 2-chlorothioxanthone is preferable. When an ink composition containing the thioxanthone-based photopolymerization initiator as described above is used, the curing property, the storage stability, and the ejection stability tend to be made more excellent. Among those mentioned above, as the thioxanthone-based photopolymerization initiator, a diethylthioxanthone is preferably contained. Since being contained, the diethylthioxanthone tends to be efficiently converted into active species by ultraviolet rays (UV rays) having a wide range.

Although a commercially available product of the thioxanthone-based photopolymerization initiator is not specifically limited, in particular, Speedcure (registered trademark) DETX (2,4-diethylthioxanthone) or Speedcure ITX (2-isopropylthioxanthone) (manufactured by Lambson Ltd.); or KAYACURE (registered trademark) DETX-S (2,4-diethylthioxanthone) (manufactured by Nippon Kayaku Co., Ltd.) may be mentioned.

A content of the thioxanthone-based photopolymerization initiator with respect to the total mass of the ink composition is preferably 2.0 percent by mass or more, more preferably 2.2 to 5.0 percent by mass, and further more preferably 2.5 to 4.0 percent by mass. Since the content described above is 2.0 percent by mass or more, the curing property of the ink composition is further improved. In addition, since the content described above is 5.0 percent by mass or less, coloring of the ink composition caused by the photopolymerization initiator itself can be suppressed.

The ink composition may also use at least one of other photopolymerization initiators besides the thioxanthone-based photopolymerization initiator. The other photopolymerization initiators each generate active species when being irradiated with radiation rays, and for example, known photopolymerization initiators, such as an acylphosphine oxide-based photopolymerization initiator, an alkylphenone-based photopolymerization initiator, and/or a titanocene-based photopolymerization initiator may be mentioned. Among those mentioned above, the acylphosphine oxide-based photopolymerization initiator is preferable. Since the photopolymerization initiator as described above is used, the curing property of the ink composition is further improved, and in particular, the curing property thereof by a curing process performed with light emitted from an UV-LED is further improved.

Although the acylphosphine oxide-based photopolymerization initiator is not particularly limited, for example, there may be mentioned 2,4,6-trimethylbenzoyl diphenylphosphine oxide, bis(2,4,6-trimethylbenzoyl)-phenylphosphine oxide, or bis(2,6-dimethoxybenzoyl)-2,4,4-trimethylpentylphosphine oxide.

As a commercially available product of the acylphosphine oxide-based photopolymerization initiator as described above, for example, there may be mentioned IRGACURE (registered trademark) 819 (bis(2,4,6-trimethylbenzoyl)-phenylphosphine oxide), IRGACURE 1800 (mixture of bis(2,6-diimethoxybenzoyl)-2,4,4-trimethylpentylphosphine oxide and 1-hydroxy-cyclohexyl-phenyl ketone at a mass ratio of 25:75), or IRGACURE TPO (2,4,6-trimethyl-benzoyl diphenylphosphine oxide) manufactured by BASF.

A content of at least one of the other photopolymerization initiators with respect to the total mass of the ink composition is preferably 3.0 to 15.0 percent by mass, more preferably 5.0 to 13.5 percent by mass, and further preferably 8.0 to 12.0 percent by mass. Since the content described above is in the range described above, the curing property of the ink composition is further improved, and the solubility of the photopolymerization initiator is further improved.

1.4. Polymerization Inhibitor

The ink composition may also contain a polymerization inhibitor. The polymerization inhibitor suppresses the progress of a polymerization reaction of the polymerizable compound when the ink composition is stored or transported. Although the polymerization inhibitor is not particularly limited, for example, there may be mentioned p-methoxyphenol (hydroquinone monomethyl ether (MEHQ)), 4-hydroxy-2,2,6,6-tetramethypyperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), or a hindered amine compound. The polymerization inhibitor may be used alone, or at least two types thereof may be used in combination.

A content of the polymerization inhibitor with respect to the total mass of the ink composition is preferably 0.05 to 1.00 percent by mass and more preferably 0.05 to 0.50 percent by mass.

1.5. Slipping Agent

The ink composition may contain a slipping agent. The slipping agent improves the abrasion resistance of the cured film. As the slipping agent, a silicone-based surfactant is preferable, and a polyester modified silicone or a polyether modified silicone is more preferable.

As the slipping agent, a commercially available product may also be used, and for example, a polyester modified silicone, such as BYK®-347 or 348, or BYK-UV3500, 3510, or 3530, or a polyether modified silicone such as BYK-3570 (each manufactured by BYK Additive & Instruments) may be mentioned. The slipping agent may be used alone, or at least two types thereof may be used in combination.

A content of the slipping agent with respect to the total mass of the ink composition is preferably 0.01 to 2.00 percent by mass and more preferably 0.05 to 1.00 percent by mass.

The ink composition may contain the following other components besides the components described above. As the other components, for example, there may be mentioned a solubilizing agent, a viscosity adjuster, a pH adjuster, an antioxidant, an antiseptic agent, a fungicide, a corrosion inhibitor, a moisturizer, and/or a chelating agent.

2. Ink Preparation Method

The ink composition can be manufactured by dispersing and mixing the components described above by an appropriate method. When the pigment is used as the colorant, the pigment, the dispersant, and parts of the polymerizable compounds to be used as a dispersion medium are preferably mixed together by an appropriate dispersing machine so as to prepare a uniform pigment dispersion liquid. Subsequently, the other components to be contained in the ink composition are added thereto and then sufficiently stirred to prepare an ink solution. After the sufficient stirring is performed, filtration was performed to remove coarse particles and foreign materials each of which may cause clogging, so that a targeted ink composition can be obtained.

3. Ink Jet Recording Apparatus

An ink jet recording apparatus used for an ink jet recording method of this embodiment will be described. As the ink jet recording apparatus, a known apparatus such as an ink jet printer may be used, and in particular, an on-carriage or off-carriage serial printer and a line head printer may be mentioned.

The ink jet recording apparatus includes an ink jet head. The ink jet head ejects liquid droplets of an ink composition so as to be adhered a recording medium or the like. The ink jet head has an actuator functioning as a driving device. As the actuator, for example, there may be mentioned a piezoelectric element which uses deformation of a piezoelectric material, an electromechanical conversion element which uses displacement of a vibration plate by electrostatic adsorption, or a thermoelectric conversion element which uses bubbles generated by heating. In this embodiment, an ink jet recording apparatus having an ink jet head which includes a piezoelectric element is used.

The ink jet recording apparatus includes a radiation source to cure the ink composition adhered to the recording medium. The radiation source is a radiation emission device and includes, for example, a light-emitting element, such as an UV-LED (ultraviolet light-emitting diode). The radiation rays emitted from the radiation source are not limited to ultraviolet rays, and for example, infrared rays, electron rays, visible light rays, or X-rays may also be mentioned. In addition, as the radiation source, instead of the light-emitting element, such as an LED (light-emitting diode) or an LD (semiconductor laser diode), a lamp may also be used. In addition, the radiation source is not limited to be installed in the ink jet recording apparatus and may be separately provided therefrom.

Since the liquid droplets of the ink composition adhered to the recording medium are irradiated with radiation rays emitted from the radiation source, a photopolymerization reaction of the polymerizable compound contained in the ink composition is advanced, and the liquid droplets of the ink composition are cured, so that a cured film thereof is formed. Accordingly, a recorded matter is manufactured.

The recorded matter of this embodiment is formed such that the radiation curable ink jet composition described above is adhered to and cured on the recording medium. Since the cured film has preferable flexibility and adhesion, even when being processed by cutting, bending, and the like, the cured film can be suppressed from being cracked and/or chipped. Hence, the recorded matter can be preferably used for sign application and the like.

4. Recording Medium

Although a material of the recording medium is not particularly limited, for example, there may be mentioned a plastic, such as a poly(vinyl chloride), a polyethylene terephthalate), a polypropylene, a polyethylene, a polycarbonate, a cellulose diacetate, a cellulose triacetate, a cellulose propionate, a cellulose butyrate, a cellulose acetate butyrate, a cellulose nitrate, a polystyrene, or polyvinyl acetal, at least one of the plastics mentioned above having a surface-treated surface, glass, paper, metal, or lumber.

In addition, the shape of the recording medium is also not particularly limited, and for example, a film, a board, a cloth, or the like may be mentioned.

5. Ink Jet Recording Method

An ink jet recording method of this embodiment ejects the radiation curable ink jet composition described above on a recording medium and emits radiation rays to the recording medium in a curing step which will be described later.

The ink jet recording method includes an ejection step of ejecting an ink composition containing a colorant and a polymerizable compound so as to be adhered to a recording medium which is contracted by heating and a curing step of curing the ink composition to obtain a recorded matter by emitting radiation rays to the ink composition adhered to the recording medium.

5.1. Ejection Step

In the ejection step, the ink composition is ejected from an ink jet head of an ink jet recording apparatus and then adhered to the recording medium. In particular, a piezoelectric element is driven, and the ink composition filled in a pressure generation chamber of the ink jet head is ejected from a nozzle.

5.2. Curing Step

In the curing step, since the radiation rays are emitted from a radiation source to the ink composition adhered to the recording medium, the ink composition is cured. In this step, a photopolymerization initiator contained in the ink is decomposed by the emission of the radiation rays, starting species, such as radicals, acids, and/or bases, are generated, and a polymerization reaction of the polymerizable compound is promoted by the function of the starting species. Alternatively, in this step, by the emission of the radiation rays, the polymerization reaction of the polymerizable compound is started. The thioxanthone-based photopolymerization initiator functions as radical active species by a hydrogen abstraction reaction.

Emission energy of the radiation rays in the curing step is set to 900 mJ/cm$^2$ or more per one emission. The emission energy described above is preferably 1,200 mJ/cm$^2$ or more per one emission and more preferably 1,500 mJ/cm$^2$ or more.

Although a radiation curable ink jet composition containing a thioxanthone-based photopolymerization initiator is excellent in curing property, yellowing is liable to occur. Accordingly, the emission energy of the radiation rays is intentionally increased, and yellowing at an initial stage caused by the emission of the radiation rays is increased. As a result, corresponding to the increase in yellowing at an initial stage described above, the yellowing with time of the cured film after the formation thereof can be suppressed. Hence, the change in color tone of the cured film between immediately after the recording and some time thereafter can be decreased. In addition, the yellowing at an initial stage described above indicates the change between the color tone of the ink composition before the ejection thereof and the color tone of the cured film 30 minutes after the emission of the radiation rays.

In the curing step, the emission of the radiation rays to the ink composition on the recording medium is preferably performed only once. Accordingly, compared to the case in which radiation rays having small emission energy are emitted a plurality of times, the yellowing at an initial stage of the cured film is promoted. Hence, the progress of the yellowing with time can be suppressed.

6. Examples

6.1. Preparation of Ink Composition

After a colorant, a dispersant, and parts of polymerizable compounds were weighed and then charged in a pigment dispersing tank, stirring was performed with ceramic-made beads having a diameter of 1 mm, so that a pigment dispersion liquid in which the colorant was dispersed in the polymerizable compounds was obtained.

Next, in order to obtain one of the compositions shown in Table 1, the remaining polymerizable compounds, a photopolymerization initiator, a polymerization inhibitor, and a slipping agent were charged in a stainless steel-made container functioning as a mixing tank and then completely dissolved by mixing and stirring. Subsequently, the pigment dispersion liquid obtained as described above was charged, and mixing and stirring were performed for one hour at ordinary temperature. Next, filtration was performed using a 5-μm membrane filter, so that the inks 1 to 4 used as the ink compositions were obtained. In addition, the numerical value of each component in the table represents percent by mass.

TABLE 1

| MATERIAL TYPE | MATERIAL NAME | INK 1 | INK 2 | INK 3 | INK 4 |
|---|---|---|---|---|---|
| POLYMERIZABLE COMPOUND | PEA | 29.7 | 34.7 | 31.2 | 29.7 |
|  | VEEA | 20.0 | 15.0 | 20.0 | 20.0 |
|  | DPGDA | 25.0 | 25.0 | 25.0 | 25.0 |
|  | ADPH | 9.0 | 9.0 | 9.0 | 9.0 |
| PHOTOPOLY-MERIZATION INITIATOR | 819 | 5.0 | 5.0 | 5.0 | 5.0 |
|  | TPO | 5.0 | 5.0 | 5.0 | 5.0 |
|  | DETX | 2.5 | 2.5 | 1.0 | 2.5 |
| POLYMERIZATION INHIBITOR | MEHQ | 0.2 | 0.2 | 0.2 | 0.2 |
| SLIPPING AGENT | BYK UV3500 | 0.5 | 0.5 | 0.5 | 0.5 |
| DISPERSANT | Solsperse36000 | 0.2 | 0.2 | 0.2 | 0.2 |
| COLORANT | P.B.15:3 | 3.0 | 3.0 | 3.0 | 0.0 |
|  | PR.122 | 0.0 | 0.0 | 0.0 | 3.0 |
| TOTAL |  | 100.0 | 100.0 | 100.0 | 100.0 |

The materials shown in Table 1 are as described below.
COLORANT (PIGMENT)
Pigment Blue 15:3 (PB15:3)
Pigment Red 122 (PR122)
DISPERSANT
Solsperse 36000 (high molecular weight dispersant, manufactured by Lubrizol
POLYMERIZABLE COMPOUND HAVING AROMATIC RING
PEA (trade name "Biscoat#192", phenoxyethyl acrylate, manufactured by Osaka Organic Chemical Industry Ltd.
POLYFUNCTIONAL MONOMER
VEEA (2-(2-vinyloxyethoxy)ethyl acrylate, manufactured by Nippon Shokubai Co., Ltd.
DPGDA (dipropylene glycol diacrylate, manufactured by Sartomer
ADPH (pentaerythritol hexaacrylate, manufactured by Shin-Nakamura Chemical Co., Ltd.
THIOXANTHONE-BASED PHOTOPOLYMERIZATION INITIATOR
DETX (trade name "Speedcure DETX", 2,4-diethylthioxahthene-9-one, manufactured by Lambson
OTHER PHOTOPOLYMERIZATION INITIATOR
819 (trade name "IRGACURE 819", bis(2,4,6-trimethylbenzoyl-phenylphosphine oxide, manufactured by BASF
TPO (trade name "IRGACURE TPO", 2,4,6-trimethylbenzoyl diphenylphosphine oxide, manufactured by BASF
POLYMERIZATION INHIBITOR
MEHQ (trade name "p-methoxyphenol", hydroquinone monomethyl ether, manufactured by Kanto Chemical Co., Inc.
SLIPPING AGENT
BYK-UV3500 (polyether modified silicone having acryloyl group, manufactured by BYK Additives & Instruments

6.2. Evaluation Method

6.2.1. Evaluation of Yellowing with Time

The inks 1 to 4 thus prepared were cured under the curing conditions shown in Table 2. In particular, the inks 1 to 4 were each filled in an ink cartridge of an ink jet printer which will be described later. As the ink jet printer, a modified label printer L-4033A in which a radiation emission device was provided in a carriage was used.

The ink cartridge described above was fitted to the above ink jet printer, and while radiation rays having a wavelength of 365 nm were emitted per one pass, a test pattern was recorded on a transparent PET film (Lumirror (registered trademark) S10) at ordinary temperature and ordinary pressure. In this case, the curing conditions shown in Table 2 were used for Examples 1 to 6 and Comparative Examples 1 to 6.

In addition, the emission energy [mJ/cm$^2$] was obtained from the product of an emission duration time [sec] and an emission intensity [mW/cm$^2$] measured on a surface irradiated with a light source. The measurement of the emission intensity was performed using an ultraviolet intensity meter UM-10 and a receiving portion UM-400 (each manufactured by KONICA MINOLTA SENSING, INC.).

emitted. That is, all emission energy was set to 1,200 mJ/cm$^2$. Accordingly, a recorded matter having a cured film of Example 5 was obtained.

In Example 6, the ink 4 was used, the emission energy of the radiation rays was set to 900 mJ/cm$^2$, and the number of emissions was set to only one. That is, all emission energy was set to 900 mJ/cm$^2$. Accordingly, a recorded matter having a cured film of Example 6 was obtained.

In Comparative Example 1, the ink 1 was used, the emission energy of the radiation rays was set to 300 mJ/cm$^2$, and the number of emissions was set to only one. That is, all emission energy was set to 300 mJ/cm$^2$. Accordingly, a recorded matter having a cured film of Comparative Example 1 was obtained.

In Comparative Example 2, the ink 1 was used, the emission energy of the radiation rays was set to 300 mJ/cm$^2$, and the number of emissions was set to three. That is, all

TABLE 2

| INK COMPOSITION | | EXAMPLE 1 INK 1 | EXAMPLE 2 INK 1 | EXAMPLE 3 INK 2 | EXAMPLE 4 INK 3 | EXAMPLE 5 INK 1 | EXAMPLE 6 INK 4 | COMPARATIVE EXAMPLE 1 INK 1 | COMPARATIVE EXAMPLE 2 INK 1 | COMPARATIVE EXAMPLE 3 INK 1 | COMPARATIVE EXAMPLE 4 INK 1 | COMPARATIVE EXAMPLE 5 INK 1 | COMPARATIVE EXAMPLE 6 INK 4 |
|---|---|---|---|---|---|---|---|---|---|---|---|---|---|
| CURING CONDITIONS | EMISSION ENERGY [mJ/cm$^2$] | 900 | 1500 | 900 | 900 | 300, 900 | 900 | 300 | 300 | 500 | 600 | 600 | 300 |
| | NUMBER OF EMISSIONS | 1 | 1 | 1 | 1 | 2 | 1 | 1 | 3 | 3 | 1 | 2 | 1 |
| | ALL EMISSION ENERGY [mJ/cm$^2$] | 900 | 1500 | 900 | 900 | 1200 | 900 | 300 | 900 | 1500 | 600 | 1200 | 300 |
| EVALUATION RESULT | YELLOWING WITH TIME (Δb*) | A | A | B | A | B | A | C | C | C | C | C | C |
| | CURING PROPERTY (TACK-FREE TEST) | A | A | A | B | A | A | B | A | A | B | A | B |

In particular, in Example 1, the ink 1 was used, the emission energy of the radiation rays was set to 900 mJ/cm$^2$, and the number of emissions was set to only one. That is, all emission energy which was the total emission energy was set to 900 mJ/cm$^2$. Accordingly, a recorded matter having a cured film of Example 1 was obtained.

In Example 2, the ink 1 was used, the emission energy of the radiation rays was set to 1,500 mJ/cm$^2$, and the number of emissions was set to only one. That is, all emission energy was set to 1,500 mJ/cm$^2$. Accordingly, a recorded matter having a cured film of Example 2 was obtained.

In Example 3, the ink 2 was used, the emission energy of the radiation rays was set to 900 mJ/cm$^2$, and the number of emissions was set to only one. That is, all emission energy was set to 900 mJ/cm$^2$. Accordingly, a recorded matter having a cured film of Example 3 was obtained.

In Example 4, the ink 3 was used, the emission energy of the radiation rays was set to 900 mJ/cm$^2$, and the number of emissions was set to only one. That is, all emission energy was set to 900 mJ/cm$^2$. Accordingly, a recorded matter having a cured film of Example 4 was obtained.

In Example 5, the ink 1 was used, the emission energy of the radiation rays was set to 300 mJ/cm$^2$, and subsequently, emission energy of the radiation rays of 900 mJ/cm$^2$ was emission energy was set to 900 mJ/cm$^2$. Accordingly, a recorded matter having a cured film of Comparative Example 2 was obtained.

In Comparative Example 3, the ink 1 was used, the emission energy of the radiation rays was set to 500 mJ/cm$^2$, and the number of emissions was set to three. That is, all emission energy was set to 1,500 mJ/cm$^2$. Accordingly, a recorded matter having a cured film of Comparative Example 3 was obtained.

In Comparative Example 4, the ink 1 was used, the emission energy of the radiation rays was set to 600 mJ/cm$^2$, and the number of emissions was set to only one. That is, all emission energy was set to 600 mJ/cm$^2$. Accordingly, a recorded matter having a cured film of Comparative Example 4 was obtained.

In Comparative Example 5, the ink 1 was used, the emission energy of the radiation rays was set to 600 mJ/cm$^2$, and the number of emissions was set to two. That is, all emission energy was set to 1,200 mJ/cm$^2$. Accordingly, a recorded matter having a cured film of Comparative Example 5 was obtained.

In Comparative Example 6, the ink 4 was used, the emission energy of the radiation rays was set to 300 mJ/cm$^2$, and the number of emissions was set to only one. That is, all emission energy was set to 300 mJ/cm². Accordingly, a recorded matter having a cured film of Comparative Example 6 was obtained.

The yellowing with time of the cured film of the recorded matter obtained as described in each of Examples and Comparative Examples was evaluated. In particular, after the recorded matter was placed on a black (L*=13) opaque poly(vinyl chloride) film so that a recording surface of the recorded matter faces upward, the L*a*b* values in the CIE/L*a*b* color system were measured using a commercially available colorimeter ("Gretag Macbeth Spectrolino", trade name, manufactured by X-Rite). As an evaluation index, the b* value in the CIE/L*a*b* color system was used.

The measurement described above was performed on the cured film of the recorded matter of each of Examples and Comparative Examples 30 minutes after the formation of the recorded matter.

Furthermore, as a weather resistant test to confirm the yellowing assumed to be obtained a half year after the formation of the recorded matter, the recorded matter of each of Examples and Comparative Examples immediately after the formation of the cured film was placed in an accelerated weathering machine (Xenon Weather Meter SX75Z, manufactured by Suga Test Instruments Co., Ltd.), and energy was applied thereto until an accumulated emission light amount of 46 MJ/m² was obtained. Subsequently, the yellowing was measured using a colorimeter similar to that described above. From the measurement result of the b* value of each example, the difference in b*, that is, Δb*, was evaluated by the following criteria, and the result is shown in Table 2.

Evaluation Criteria of Yellowing with Time
    A: Δb* of less than 2
    B: Δb* of 2 to less than 5
    C: Δb* of 5 or more 6.2.2. Evaluation of Curing Property As an index of the curing property, a cotton swab-rubbing tackiness evaluation (tack-free test) was performed. In particular, the ink composition was applied on a PET film (PET50A PL Thin, trade name, manufactured by Lintec Corporation) by a bar coater. Immediately after the application, ultraviolet rays having a peak wavelength of 395 nm were emitted from an LED under the curing conditions shown in Table 2, so that a cured film was obtained. The thickness of the cured film thus obtained was 8 μm. Subsequently, the surface of the cured film was rubbed 10 times by a cotton swab with a load of 100 g, and whether the cotton swab was colored or not was determined.

Evaluation Criteria of Curing Property
    A: Cotton swab is not colored (curing is completed).
    B: Cotton swab is colored (curing is not completed).

6.3. Evaluation Result

From Examples and Comparative Examples, the following was found.

In the evaluation of the curing property, a preferable result was confirmed in the ink in which the thioxanthone-based photopolymerization initiator was contained at a content of 2.0 percent by mass or more with respect to the total mass of the ink composition.

That is, in Examples 1, 2, 3, 5, and 6 and Comparative Examples 2, 3, and 5, since the inks 1, 2, and 4 were used, and all emission energy was higher than 300 mJ/cm², the curing was performed, and a preferable result was obtained in each Example.

In the evaluation of the yellowing with time, a preferable result was confirmed in the ink jet composition in which the emission energy of the radiation rays was set to 900 mJ/cm² or more per one emission.

That is, in Examples 1, 2, 3, 4, and 6, since the emission energy of the radiation rays was set to 900 mJ/cm² or more per one emission, a preferable result was obtained in the evaluation of the yellowing with time.

In Comparative Examples 1, 2, 3, 4, 5, and 6, since the emission energy of the radiation rays per one emission was set to less than 900 mJ/cm², the yellowing with time was not suppressed.

What is claimed is:

1. An ink jet recording method comprising:
    ejecting a radiation curable ink jet composition on a recording medium; and
    emitting radiation rays to the recording medium,
    wherein the ink jet composition contains a colorant and a thioxanthone-based photopolymerization initiator,
    the colorant includes neither a yellow-based colorant nor a black-based colorant,
    the thioxanthone-based photopolymerization initiator includes at least one selected from the group consisting of a diethylthioxanthone, an isopropylthioxanthone, and a chlorothioxanthone, and
    emission energy of the radiation rays is set to 900 mJ/cm² or more per one emission,
    wherein the radiation curable ink jet composition includes a polymerization inhibitor, and
    the polymerization inhibitor includes at least one or more of cresol, t-butylcatechol, 3,5-di-t-butyl-4-hydroxytoluene, 2,2'-methylenebis(4-methyl-6-t-butylphenol), 2,2''-methylenebis(4-ethyl-6-butylphenol), 4,4'-thiobis(3-methyl-6-t-butylphenol), and a hindered amine compound.

2. The ink jet recording method according to claim 1, wherein the emission of the radiation rays to the ink jet composition is performed only once.

3. The ink jet recording method according to claim 1, wherein a content of the thioxanthone-based photopolymerization initiator with respect to a total mass of the ink jet composition is 2.0 percent by mass or more.

4. The ink jet recording method according to claim 1, wherein the ink jet composition further contains a polymerizable compound having an aromatic ring, and
    a content of the polymerizable compound with respect to the total mass of the ink jet composition is 34 percent by mass or less.

5. The ink jet recording method according to claim 1, wherein the emission energy of the radiation rays is set to 1200 mJ/cm2 or more per one emission.

* * * * *